Dec. 7, 1937.   R. J. WINSOR   2,101,567
DRAG
Filed May 4, 1936
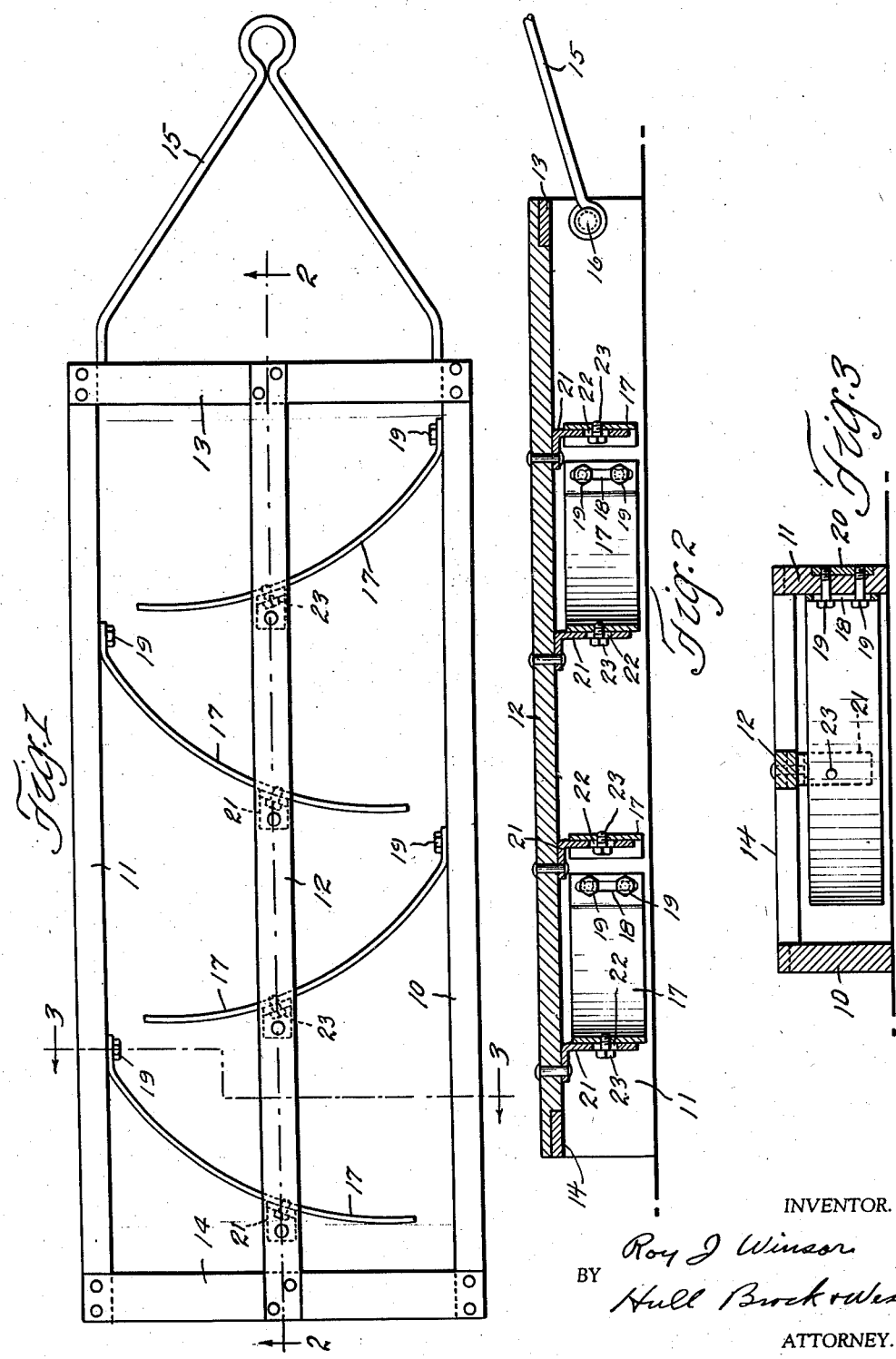
INVENTOR.
Roy J. Winsor
BY Hull Brock & West
ATTORNEY.

Patented Dec. 7, 1937

2,101,567

UNITED STATES PATENT OFFICE 2,101,567

DRAG

Roy J. Winsor, Marion, Ohio

Application May 4, 1936, Serial No. 77,769

4 Claims. (Cl. 37—148)

This invention relates to a drag particularly adapted for road building and maintenance.

The principal object of the invention is to provide a drag having a novel blade construction whereby to be more effective in carrying and spreading the material than drags of standard straight blade construction.

Other and more limited objects will become apparent from the following description when read in connection with the accompanying drawing wherein Fig. 1 is a plan view of a drag embodying my invention; Fig. 2 is a vertical section on the line 2—2 of Fig. 1 and Fig. 3 is a transverse section on the line 3—3 of Fig. 1.

Referring now to the drawing the numerals 10 and 11 indicate side frame members and the numeral 12 indicates an intermediate blade supporting means. The elements 10, 11 and 12 are connected by transverse frame members 13 and 14. The members 10 and 11 are adapted to form runners as will be clear from Fig. 3 while the member 12 is positioned above the blades. A draft element 15 is pivotally secured to the front ends of the members 10 and 11 as indicated at 16. This element may be attached to a tractor or the device may be horse drawn.

I prefer to employ a plurality of curved blades 17 each attached at its forward end to one of the side members 10 and 11, alternate blades being attached to the element 10 and the remaining ones attached to the element 11. Each of the blades is curved in such manner that the angle between such blade and the side frame element to which it is attached is constantly increasing from the forward to the rearward end thereof so that as the earth or similar material approaches the rearward end of the blade, it has a greater tendency to be carried and a smaller tendency to be delivered off the blade. While I may use a drag having only one such blade, I prefer to use them in a staggered series as indicated.

I am aware that a blade which will function in a similar manner may be composed of straight sections angularly disposed with respect to each other but these are less desirable than a smoothly curved blade since the latter will have less tendency to clog and will shed the material better.

At the forward ends of the blades they are made adjustable with respect to the elements to which they are attached. In the drawing, I have shown one means of adjusting the blades with respect to the elements 10 and 11 which comprises a slot 18 formed in the blade and receiving bolts 19 which are threaded into metallic plates 20. Centrally the adjustment may be secured by providing a plurality of angles 21 each of which is provided with a slot 22 adapted to receive a bolt 23. I am aware that numerous other adjustable mountings are possible and show this form merely as an example.

From the foregoing description of my improved drag, it is thought obvious that its function of increased spreading of earth or similar material for a given size blade will be clear.

While I have shown and described the preferred form of my invention, I do not wish to be limited to the details shown but only in accordance with the appended claims and the prior art.

Having thus described my invention, what I claim is:

1. A drag comprising, in combination, a framework, a plurality of curved blades carried thereby, alternate blades being reversely positioned and each blade being positioned with respect to said framework to present a gradually increasing angle with the direction of motion of the drag from its forward end to its rearward end each blade overlapping adjacent blades substantially its entire length, and supporting means for said blades extending therebelow.

2. A drag comprising, in combination, a framework and a plurality of curved blades carried thereby, alternate blades being reversely positioned and overlapping for delivery of material from the rear end of one to a portion adjacent the front end of the next and each blade being positioned with respect to said framework to present a gradually increasing angle with the direction of motion of the drag from its forward end to its rearward end.

3. A drag comprising, in combination, a framework having forwardly and rearwardly extending side blade supporting frame elements and intermediate blade supporting means, a plurality of blades carried by said framework, alternate blades being secured at their forward ends to opposite, side, blade supporting, frame elements and all said blades being secured to said intermediate, blade supporting means and terminating short of the opposite side, blade supporting, frame element, each of said blades being curved and positioned with respect to said framework to present a gradually increasing angle with the direction of motion of the drag from its forward end to its rearward end.

4. A drag comprising, in combination, a framework having forwardly and rearwardly extending side blade supporting frame elements and intermediate blade supporting means, a plurality of blades vertically adjustably carried by said framework, alternate blades being secured at their forward ends to opposite, side, blade supporting, frame elements and all said blades being secured to said intermediate, blade supporting means and terminating short of the opposite side, blade supporting, frame element, each of said blades being curved and positioned with respect to said framework to present a gradually increasing angle with the direction of motion of the drag from its forward end to its rearward end.

ROY J. WINSOR.